US010198646B2

(12) United States Patent
Atasu et al.

(10) Patent No.: US 10,198,646 B2
(45) Date of Patent: Feb. 5, 2019

(54) HARDWARE COMPILATION OF CASCADED GRAMMARS

(71) Applicant: International Business Machines Corporation, Armonk, NY (US)

(72) Inventors: Kubilay Atasu, Horgen (CH); Akihiro Nakayama, Kanagawa (JP); Raphael Polig, Dietikon (CH); Tong Xu, Markham (CA)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 15/201,146

(22) Filed: Jul. 1, 2016

(65) Prior Publication Data
US 2018/0005060 A1  Jan. 4, 2018

(51) Int. Cl.
*G06F 17/00* (2006.01)
*G06K 9/00* (2006.01)
*G06F 17/27* (2006.01)

(52) U.S. Cl.
CPC ..... *G06K 9/00986* (2013.01); *G06F 17/2785* (2013.01); *G06K 9/00442* (2013.01)

(58) Field of Classification Search
CPC ........... G06F 17/3002; G06F 17/30023; G06F 17/30011
USPC .......................................................... 704/9
See application file for complete search history.

(56) References Cited

U.S. PATENT DOCUMENTS

| | | | | |
|---|---|---|---|---|
| 6,745,161 | B1* | 6/2004 | Arnold | G06F 17/30616 704/7 |
| 6,910,003 | B1* | 6/2005 | Arnold | G06F 17/30616 704/1 |
| 7,657,495 | B2* | 2/2010 | Hunter | G06N 5/04 706/20 |
| 7,716,039 | B1 | 5/2010 | Bangalore et al. | |
| 8,543,383 | B2 | 9/2013 | Mohri et al. | |
| 2003/0078766 | A1* | 4/2003 | Appelt | G06F 17/30616 704/9 |
| 2004/0172234 | A1 | 9/2004 | Dapp et al. | |
| 2007/0005343 | A1* | 1/2007 | Sandor | G06F 17/30675 704/9 |
| 2014/0317134 | A1 | 10/2014 | Chen et al. | |
| 2016/0019034 | A1 | 1/2016 | Glendenning et al. | |

OTHER PUBLICATIONS

Kubilay Atasu, et al., "Hardware-Accelerated Regular Expression Matching with Overlap Handling on IBM PowerEN Processor," 2013 IEEE 27th International Symposium on Parallel & Distributed Processing, pp. 1254-1265.

* cited by examiner

*Primary Examiner* — Daniel Abebe
(74) *Attorney, Agent, or Firm* — Daniel P. Morris, Esq.; Hoffmann & Baron, LLP

(57) ABSTRACT

A cascaded finite-state-transducer array includes a plurality of finite-state-transducers, the finite-state-transducers being distributed in space. The finite-state-transducer array is configured with dedicated data transfer channels between the finite-state-transducers to transfer specific data types. Each data stream on a dedicated data transfer channel may transmit a particular data type, which may be sorted in increasing order of start offsets or token IDs.

17 Claims, 12 Drawing Sheets

HARDWARE COMPILATION OF CASCADED GRAMMARS

BACKGROUND

The present invention relates to techniques for generating and using hardware-accelerated cascaded finite state transducers that may ingest a document corpus and analyze its content.

The process of extracting information from large-scale unstructured text is called text analytics and has applications in business analytics, healthcare, and security intelligence. For example, in the healthcare domain, domain-specific document processors may be used to identify, normalize, and code medical and social facts in unstructured content, such as in patient records and in medical journals. Analyzing unstructured text and extracting insights hidden in it at high bandwidth and low latency are computationally challenging tasks. In particular, text analytics functions typically rely heavily on finite-state-machine processing-based tasks. Typically, much of the execution time of text analytics runtime systems is spent on shallow parser stages of document processors, which may be built software-based finite state transducer libraries.

Accordingly, a need arises for techniques by which the execution time of finite state transducer libraries may be reduced, to provide improved performance and reduced cost.

SUMMARY

Embodiments of the present invention may provide the capability for generating and using hardware-accelerated cascaded finite state transducers that input a document corpus and analyze its content. This may provide improved price per performance when running text analytics.

In an embodiment of the present invention, a cascaded finite-state-transducer array comprises a plurality of finite-state-transducers, the finite-state-transducers being distributed in space, wherein the array is configured with dedicated data transfer channels between the finite-state-transducers to transfer specific data types. Each data stream on a dedicated data transfer channel may transmit a particular data type, which may be sorted in increasing order of start offsets or token IDs. The cascaded finite-state-transducer array may further comprise circuitry for each finite-state-transducer adapted to synchronize input streams of the finite-state-transducer by requiring either a valid-data or an input-end signal on each stream. The input-end signal may comprise an end-of-stream, end-of-sentence, or end-of-paragraph signal. The cascaded finite-state-transducer array may further comprise circuitry for each finite-state-transducer adapted to produce an input-end signal for the finite-state-transducer when all input data streams of the finite-state-transducer contain an input-end signal. The cascaded finite-state-transducer array may further comprise input buffering circuitry for each finite-state-transducer adapted to stall or pause processing of the finite-state-transducer until all input data streams of the finite-state-transducer contain data that can be consumed. The cascaded finite-state-transducer array may further comprise circuitry for each finite-state-transducer adapted to fetch data only from the input streams containing valid data and have a smallest start offset or start token ID. At least one finite-state-transducer may include a loop, and the cascaded finite-state-transducer array may further comprise a finite-state-machine based controller adapted to control stalling of processing of the loop by the at least one finite-state-transducer. The cascaded finite-state-transducer array may further comprise a top-level pipeline comprising a decoder adapted to decode data types of data input to the array, and a multiplexer to multiplex data types of data output from the array.

In an embodiment of the present invention, a cascaded finite-state-transducer array may comprise a plurality of finite-state-transducers, the finite-state-transducers comprising a network of nondeterministic finite state automatons, the nondeterministic finite state automatons being distributed in space, wherein the array is configured with dedicated data transfer channels between the finite-state-transducers to transfer specific data types. The cascaded finite-state-transducer array may further comprise circuitry for each finite-state-transducer adapted to locally store, in each finite-state-transducer state a number of features incrementally built from input data streams of the finite-state-transducer. The cascaded finite-state-transducer array may further comprise circuitry for each finite-state-transducer adapted to update the locally stored features on state transitions, or write the locally stored features to outputs of the finite-state-transducer on state transitions. The cascaded finite-state-transducer array may further comprise circuitry for each finite-state-transducer adapted to determine when two independent state transitions lead to the same destination state and update the features based on a state transition that is associated with a higher priority data type, a state transition originating from a source state that stores a smaller start-offset value, or a state transition that is associated with a data type that stores a larger end-offset or end-token-ID value. At least one finite-state-transducer may include a loop, and the cascaded finite-state-transducer array may further comprise a finite-state-machine based controller adapted to control stalling of processing of the loop by the at least one finite-state-transducer. The cascaded finite-state-transducer array may further comprise a top-level pipeline comprising a decoder adapted to decode data types of data input to the array, and a multiplexer to multiplex data types of data output from the array.

In an embodiment of the present invention, a computer-implemented method for generating a cascaded finite-state-transducer implementation may comprise compiling a grammar file containing specification of cascading grammar analytics to a hardware description file containing a hardware description of finite-state-transducer circuitry to implement a plurality of scanners using the cascading grammar analytics, generating, for each finite-state-transducer, a hardware description of a cascade of finite-state-transducers based on data dependencies within each scanner, and generating, for each finite-state-transducer, a hardware description of a cascade of scanners based on data dependencies across the plurality of scanners. The grammar file may be compiled by intercepting intermediate data structures in the grammar file to determine nondeterministic finite state automaton representations of the plurality of finite-state-transducers, reducing complexity of nondeterministic finite state automaton representations, and generating a hardware description of finite-state-transducer circuitry based on the reduced nondeterministic finite state automaton representations. The hardware description of the cascade of finite-state-transducers based on data dependencies within each scanner may be generated by constructing a data-flow-graph representation of each scanner, wherein nodes of the data-flow-graph representation represent finite-state-transducers of the scanner and the edges represent the data types transferred between the finite-state-transducers of the scanner, and generating the hardware description based on the data-flow-graph representations. The hardware description of the cascade of finite-state-transducers across the plurality of scanners may be generated by constructing a data-flow-graph representation of each scanner, wherein nodes of the data-flow-graph representation represent the scanners and the edges represent the data types transferred between the scanners, and generating the hardware description based on the data-flow-graph representations.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present invention may provide the capability to hardware-accelerate finite state transducer libraries and their compilation toolchains, which may provide improved the price per performance when running text analytics.

Embodiments of the present invention may provide, for example, an Unstructured Information Management Architecture (UIMA) pipeline, which may be exported in the form of a Processing Engine ARchive (PEAR) file. A PEAR file is the UIMA standard packaging format for UIMA components. A PEAR package may be used to distribute and reuse components within UIMA applications. The UIMA framework may also provide APIs and methods to automatically deploy and verify PEAR packages. A PEAR package is typically built in a hierarchical fashion, wherein the highest level of hierarchy may be composed of analysis engines. Each analysis engine, in turn, may be a composition of a set of library-based or user-defined components.

When parsing rules are defined, such rules are typically automatically translated into cascaded grammars. The notion of running more than one grammar, in sequence, with later ones using matches from earlier scans, is commonly referred to as grammar cascading. This may be a convenient and effective strategy for a variety of different tasks. One of the primary reasons for organizing a text analysis task as a sequence of cascaded grammars, as opposed to designing a single automaton, is that frequently more complex patterns can be easier, and more naturally, described in terms of simpler ones.

For each defined parsing rule, several grammars may be created that are cascaded inside components called scanners. These grammars may be exported into files, such as .cfg files. Each .file may then be compiled into a finite state transducer (FST), and stored in a file, such as an .fst file, inside the PEAR package. Such a file may be executed by a runtime library, such as the Java finite state transducer runtime library (JFST), which may also be provided as part of the PEAR file. The scanner components may then be cascaded in an analysis engine that implements one of the parsing stages of a UIMA pipeline.

Figure 1:
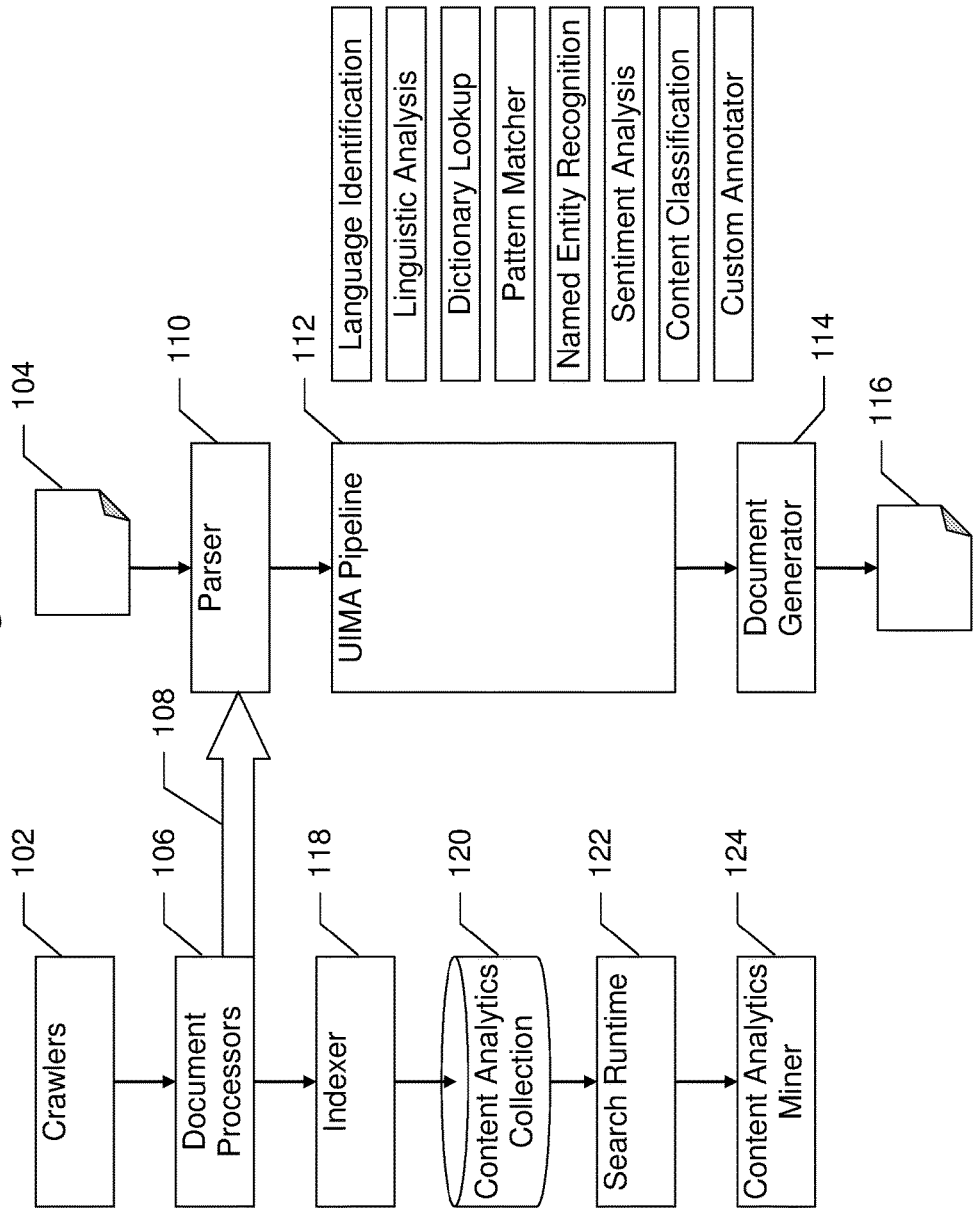
FIG. 1 is an exemplary data flow diagram of data flow defined within a UIMA PEAR file.

An exemplary data flow diagram of data flow defined within a UIMA PEAR file is shown in FIG. 1. In this example, one or more documents may be obtained by one or more crawlers 102, which systematically browse (crawl) the World Wide Web to obtain documents to be processed. Each document so obtained, such as crawled document 104, may be input to one or more document processors 106. The processing 108 performed by document processors 106 may begin with crawled document 104 being received. Crawled document 104 may be input to parser 110, which may perform syntactic analysis of the text and/or other symbols included in the document. The output information from parser 110 may be input to UIMA Pipeline 112, which may perform a variety of analytic processes, including, for example, Language Identification, Linguistic Analysis, Dictionary Lookup, Pattern Matching, Named Entity Recognition, Sentiment Analysis, Content Classification, and Custom Annotation. The results of the analytic processes may be combined in document generator 114 to form an output document 116. Typically, output document 116 may be in the Apache Lucene format. Output document 116 may then be input to the remaining processing blocks, such as Indexer 118, Content Analytics Collection 120, Runtime Search 122, and Content Analytics Miner 124, for further processing.

Figure 2:
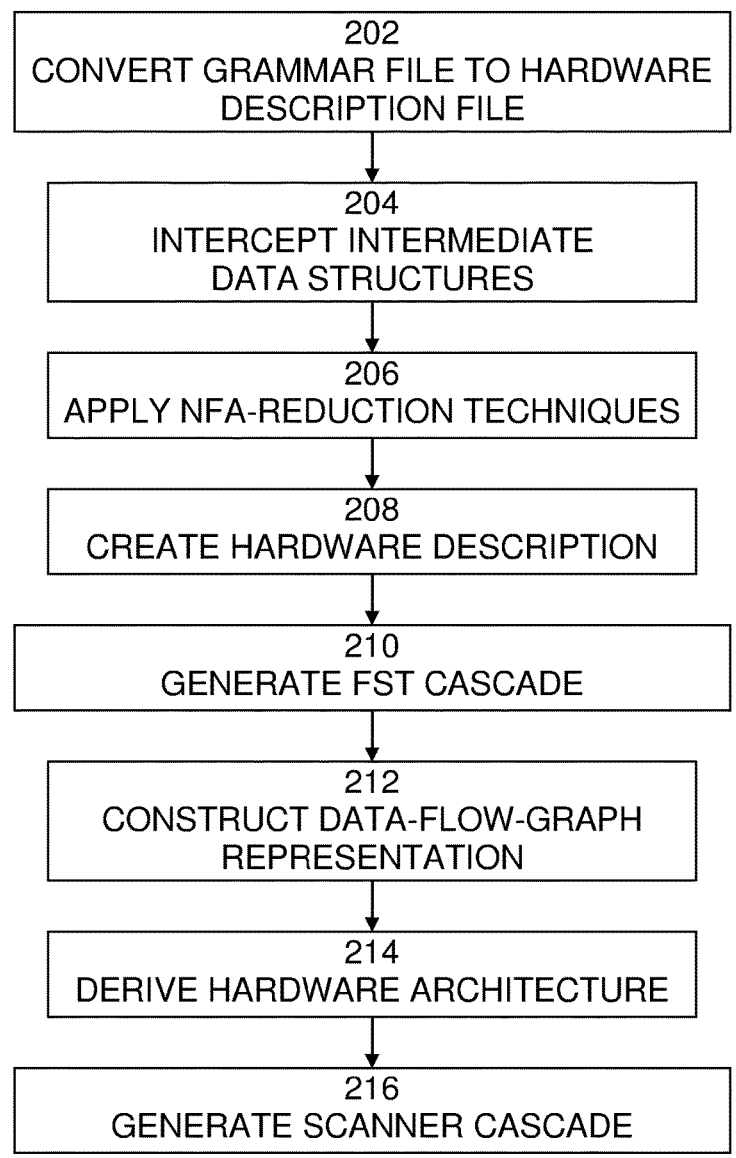
FIG. 2 is an exemplary flow diagram of a process for generating hardware-accelerated finite-state-transducer (FST) and scanner cascades derived from a set of cascaded grammars given in a UIMA PEAR file.
Figure 3:
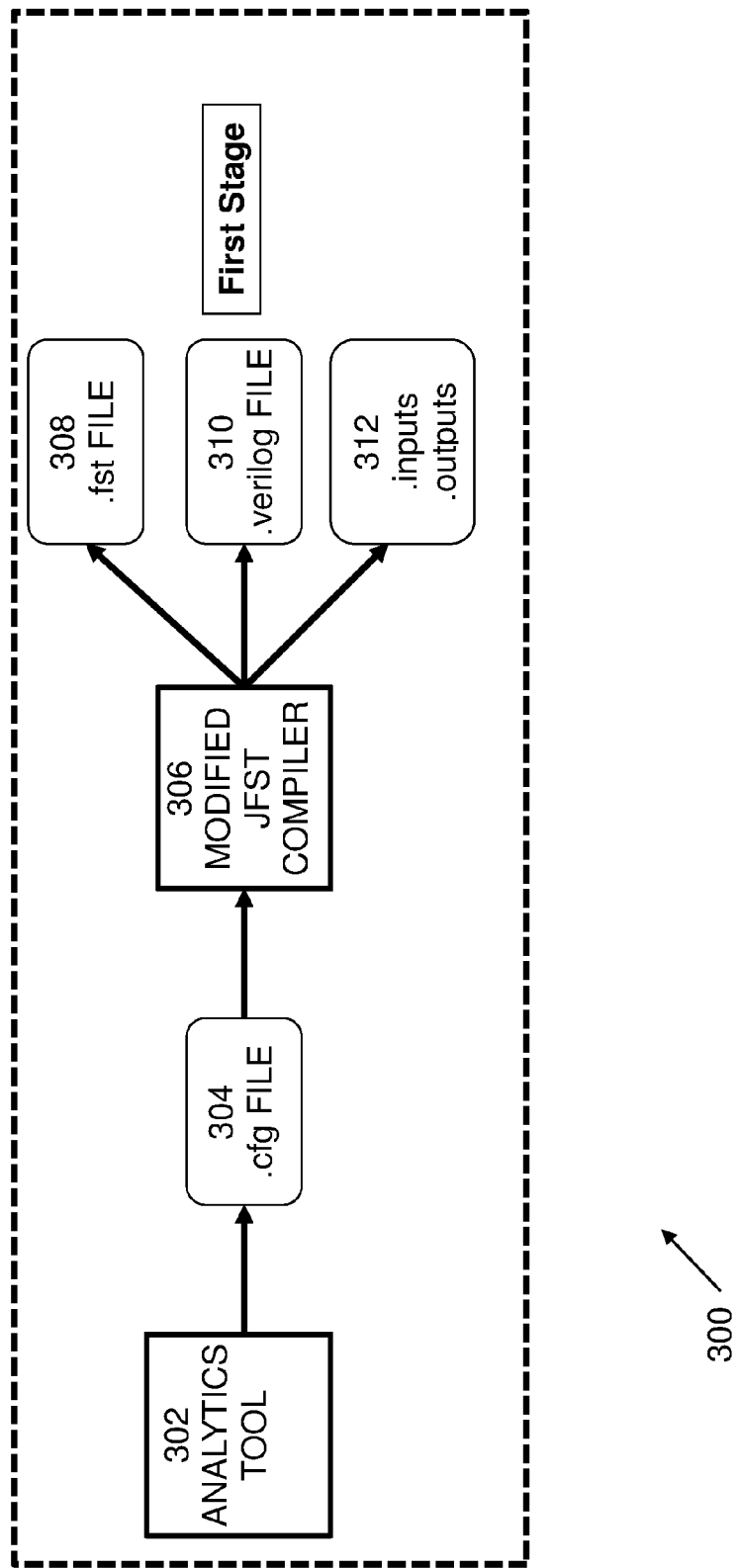
FIG. 3 is an exemplary data flow diagram of compilation of grammar files to form hardware description files.

An exemplary flow diagram of a process 200 for generating hardware-accelerated FST and scanner cascades derived from a set of cascaded grammars given in a UIMA PEAR file is shown in FIG. 2. Process 200 begins with 202, in which each grammar file, such as a .cfg file, may be converted into a hardware description file, such as a .verilog file, for example, as shown in FIG. 3. In the example shown in FIG. 3, analytics tool 302 may generate grammar files, such as .cfg files, and may compile them using, for example using modified JFST compiler 306, to generate one or more compilation flow files, such as FST (.fst) files 308. The .cfg to .fst path may be modified to produce a hardware description file, such as .verilog file 310, in a hardware description language, such as the Verilog language, for each FST contained in the PEAR file.

Returning to FIG. 2, at 204, intermediate data structures created by the analytics tool may be intercepted. Such data structures may include a nondeterministic finite state automaton (NFA) representation of the FST, the starting and the accepting states of the NFA, the state transitions of the NFA, and the symbols that are tested and posted on the state transitions. At 206, NFA-reduction techniques may be applied. For example, such techniques may include epsilon removal and state merging to create a hardware friendly representation of the FST. At 208, a hardware description of the reduced NFA may be created in a hardware description language, such as verilog. This is described in more detail below, in relation to the discussion of FIGS. 10 and 11.

Figure 4:
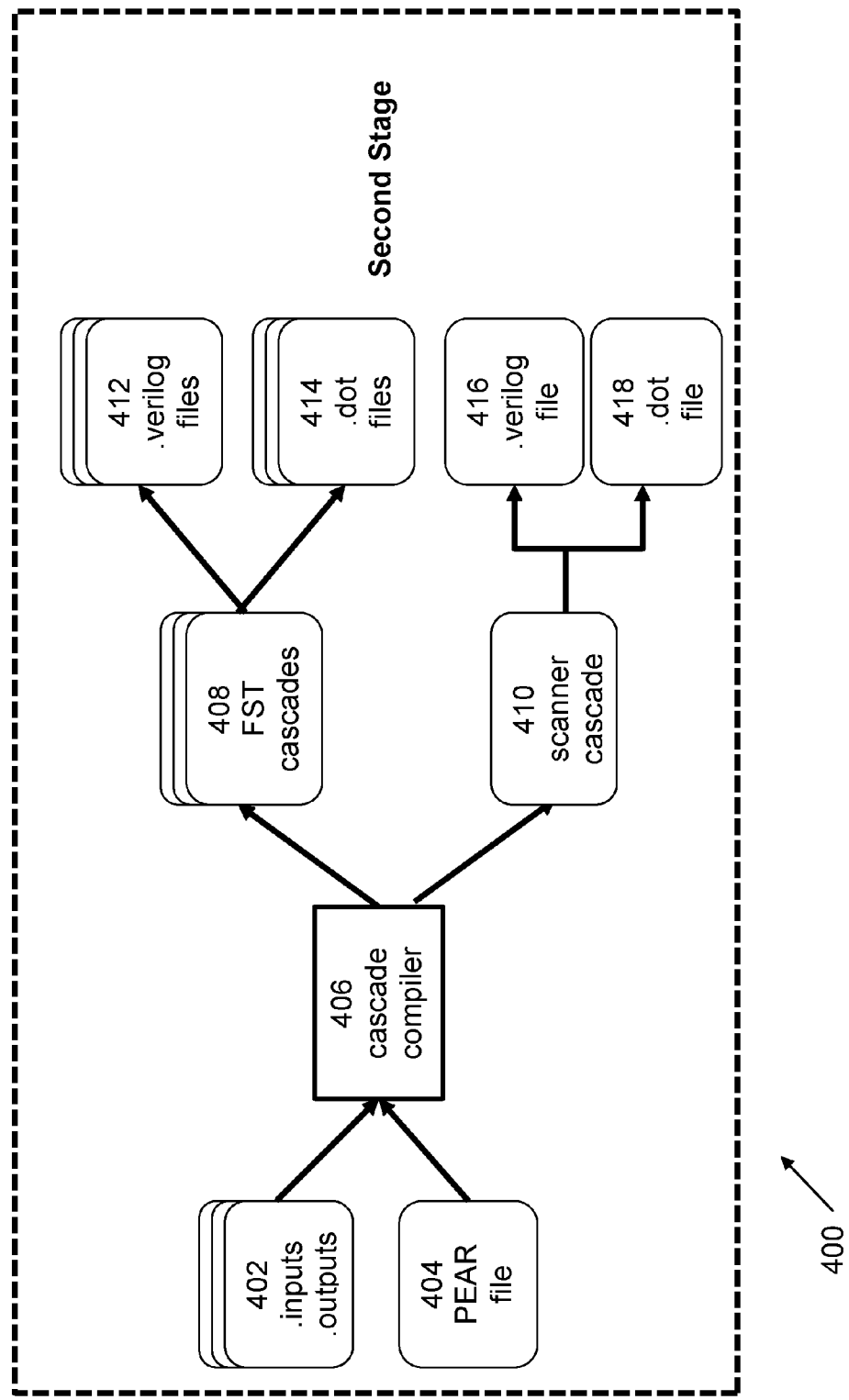
FIG. 4 is an exemplary data flow diagram of generation of an FST cascade.

At 210, an FST cascade is generated within each FST, as shown, for example, in FIG. 4. In the example shown in FIG. 4, a scanner cascade 410 may be constructed by analyzing the data dependencies across the scanners contained in the PEAR file 404. Within each scanner, an FST cascade 408 may be constructed by analyzing the data dependencies across the FSTs contained. At 212, a data-flow-graph representation of each scanner may be constructed, wherein the nodes represent FSTs and the edges represent the data types transferred between the FSTs. The data-flow graph representation may be derived based on the input and the output types of each FST and based on the control flow information given as part of the scanner description, which defines the order in which the FSTs should be executed. The combination of the control and data flow information provides the capability to derive a hardware architecture at 214, wherein a finite-state-machine-based controller directs the execution of the data-flow graph. This is described in more detail below, in relation to the discussion of FIG. 8.

At 216, a scanner cascade 410 may be generated for a complete analysis engine or for a selected set of scanners used in the PEAR file. A cascade compiler 406 may analyze the PEAR file using, for example, the Apache UIMA API. A scanner cascade 410 may be constructed by analyzing the data dependencies across scanners. A data-flow-graph representation may be constructed, wherein the nodes represent scanners and the edges represent the data types transferred between the scanners. The data-flow graph representation may be derived based on the input and the output types of each scanner and based on the control flow information given as part of the PEAR file, which defines the order in which the scanners should be executed. The scanner cascade 410 and the FST cascades 408 may be exported, for example, in Verilog 412, 416 or dot 414, 418 formats.

Figure 5:
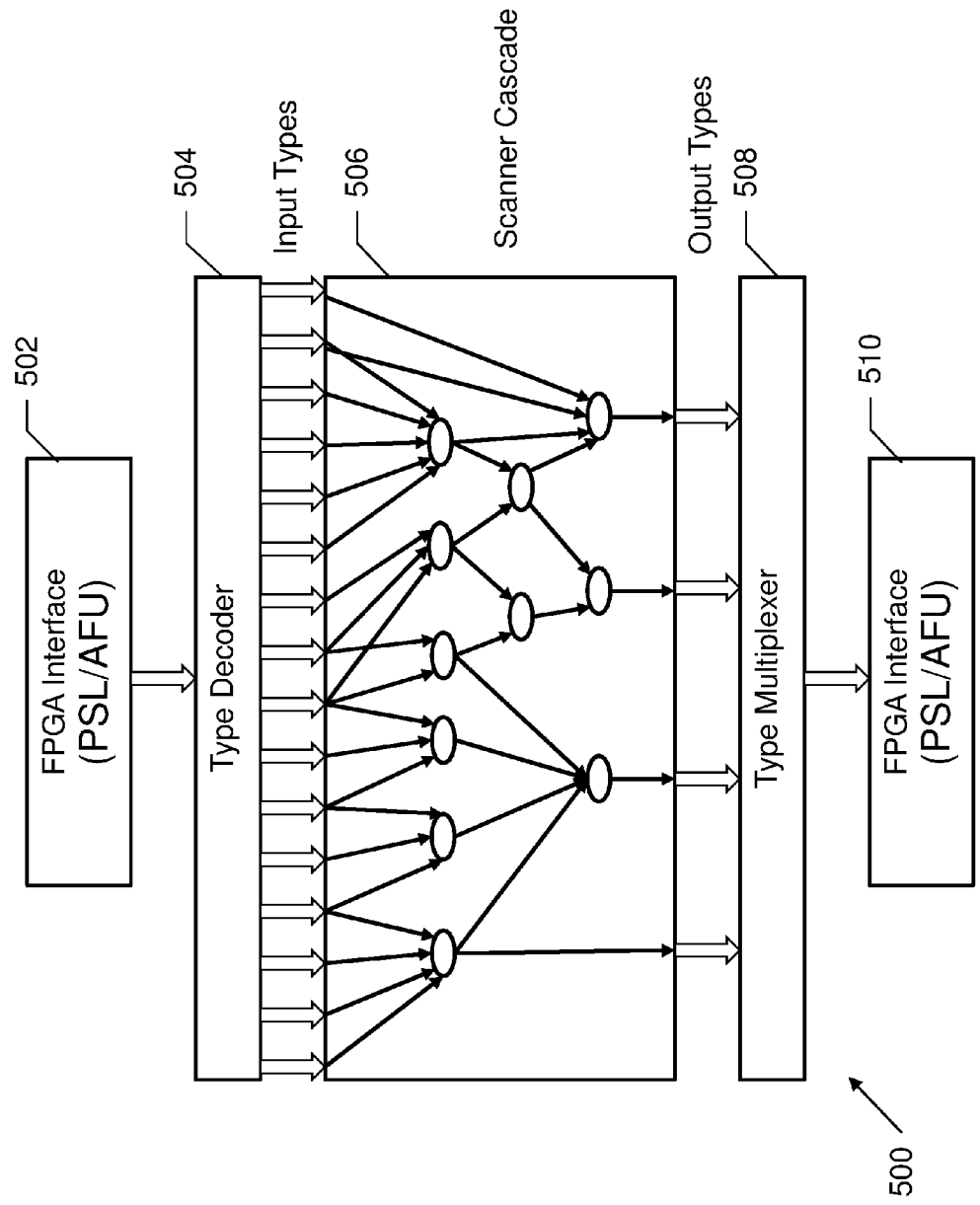
FIG. 5 is an exemplary diagram of a generated hardware scanner cascade.

The top-level architecture of an exemplary generated hardware scanner cascade 500 is shown in FIG. 5. In this example, cascade 500 includes an input interface 502, a type decoder 504, a scanner cascade 506, a type multiplexer 508, and an output interface 510. Input interface 502 may include a Field-Programmable Gate Array (FPGA) interface, when implemented in an FPGA. Such an interface may comply with the Power Service Layer (PSL)/Accelerator Function Unit (AFU) specification. The streaming interface supports zero-overhead data transfers between scanners via dedicated data transfer channels supporting a handshake protocol. FIFO buffers can be optionally inserted between communicating scanners. Receive data, such as the Apache UIMA types consumed by the hardware accelerated FST cascade from a service layer, such as input interface 502 (the PSL/AFU interface for Coherent Accelerator Processor Interface (CAPI)). The service layer may transfer these input types from storage locations such as the main memory of a host processor, an on-board memory of the accelerator, an on-chip memory of the accelerator, or from multiple different sources. For each data type, such as Apache UIMA types, or for groups of data types, the type decoder may create a dedicated data stream and produce control signals such as valid (i_v), data (i_d), and end-of-stream (i_e) signals. The control signals may be used to incorporate the decoder into a streaming dataflow pipeline that implements a scanner cascade 506.

A dataflow pipeline that implements a scanner cascade 506 may be constructed by analyzing the data dependencies between the scanners. Such an analysis may take into account the input and the output data types of the scanners and the control flow information given in the PEAR file. More formally, if a scanner s1 produces a type that is consumed by the scanner s2 and if s2 is executed after s1, a streaming interface may be created between s1 and s2 to transfer the respective data type from s1 to s2.

Figure 6:
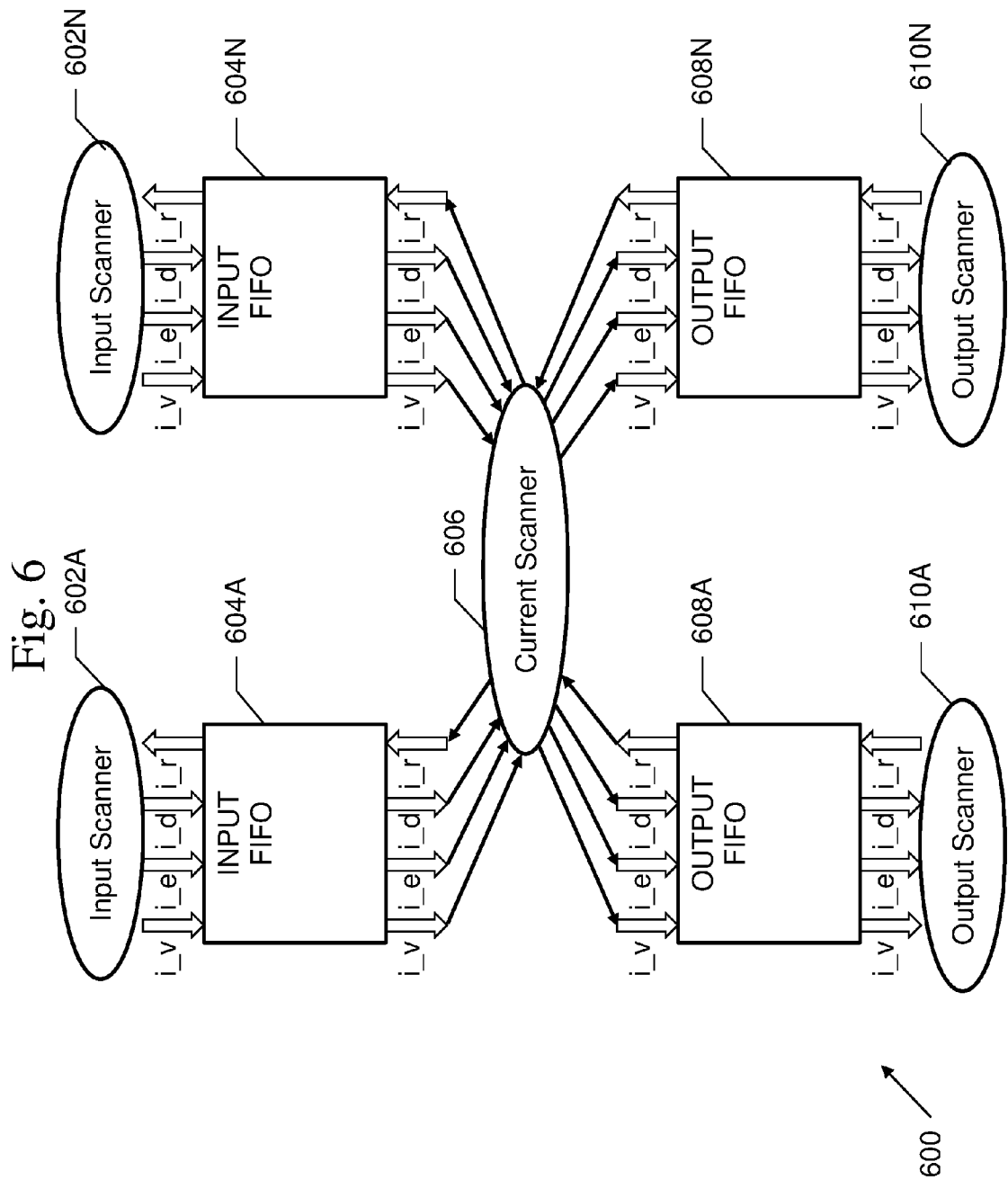
FIG. 6 is an exemplary block diagram of a streaming interface that may be created between scanners.

An example of a streaming interface 600 that may be created between the scanners is shown in FIG. 6. In this example, there may be one or more input scanners 602A-N, one or more input FIFOs 604A-N, a current scanner 606, one or more output FIFOs 608A-N, and one or more output scanners 608A-N. A handshake protocol may be used to transfer data between the scanners. Such a handshake protocol may be implemented using control signals such as ready (i_r) and valid (i_v) signals. Input FIFOs 604A-N and output FIFOs 608A-N are optional.

Returning to FIG. 5, the new or the updated data types produced by the scanner cascade 506 may be output by the type multiplexer 508 through a service layer 510. As with the input, the service layer may be a PSL/AFU interface for Coherent Accelerator Processor Interface (CAPI). The output data types may be transferred to storage such as the main memory of a host processor, an on-board memory of the accelerator, an on-chip memory of the accelerator.

Figure 7:
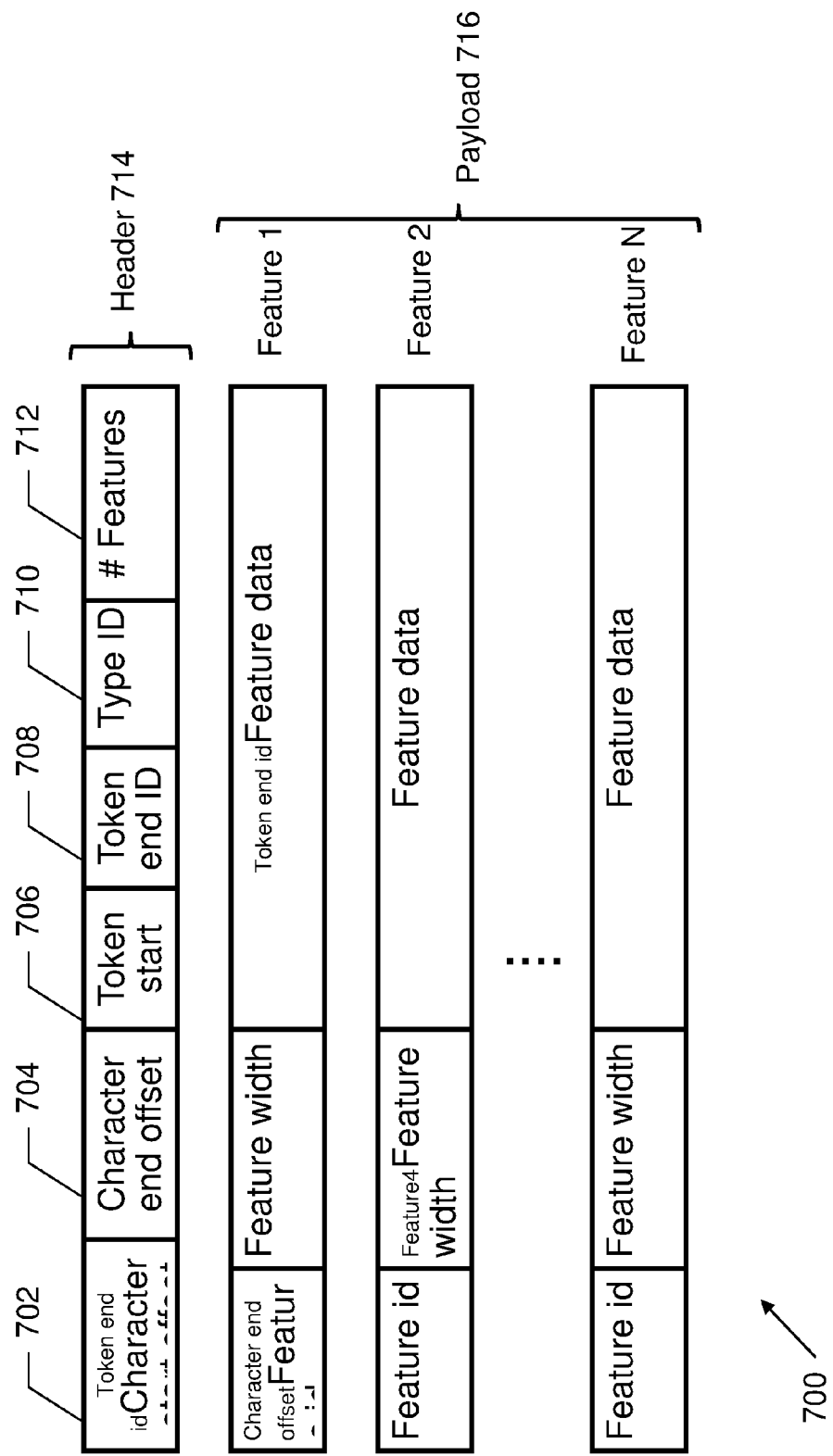
FIG. 7 is an exemplary diagram of data structures that may be used to exchange UIMA data types and features between hardware modules.

An example of data structures 700 that may be used to exchange UIMA data types and features between hardware modules is shown in FIG. 7. For each type, a character start offset 702, a character end offset 704, a token start ID 706, a token end ID 708, a type ID 710, and a number of features included in the type 712 may be stored to mark the start and end offset positions of the respective piece of text within a given text document. In addition, each data type instance may be associated with a type ID. A data type may define and use a number of features, which may be stored in the form of strings, numbers, etc. These features may be allocated contiguously as part of the type data structure within a data packet that may contain a header 714 and a payload 716. Alternatively, the features may be allocated in separate memory regions and provided on demand by the service layer.

Figure 8:
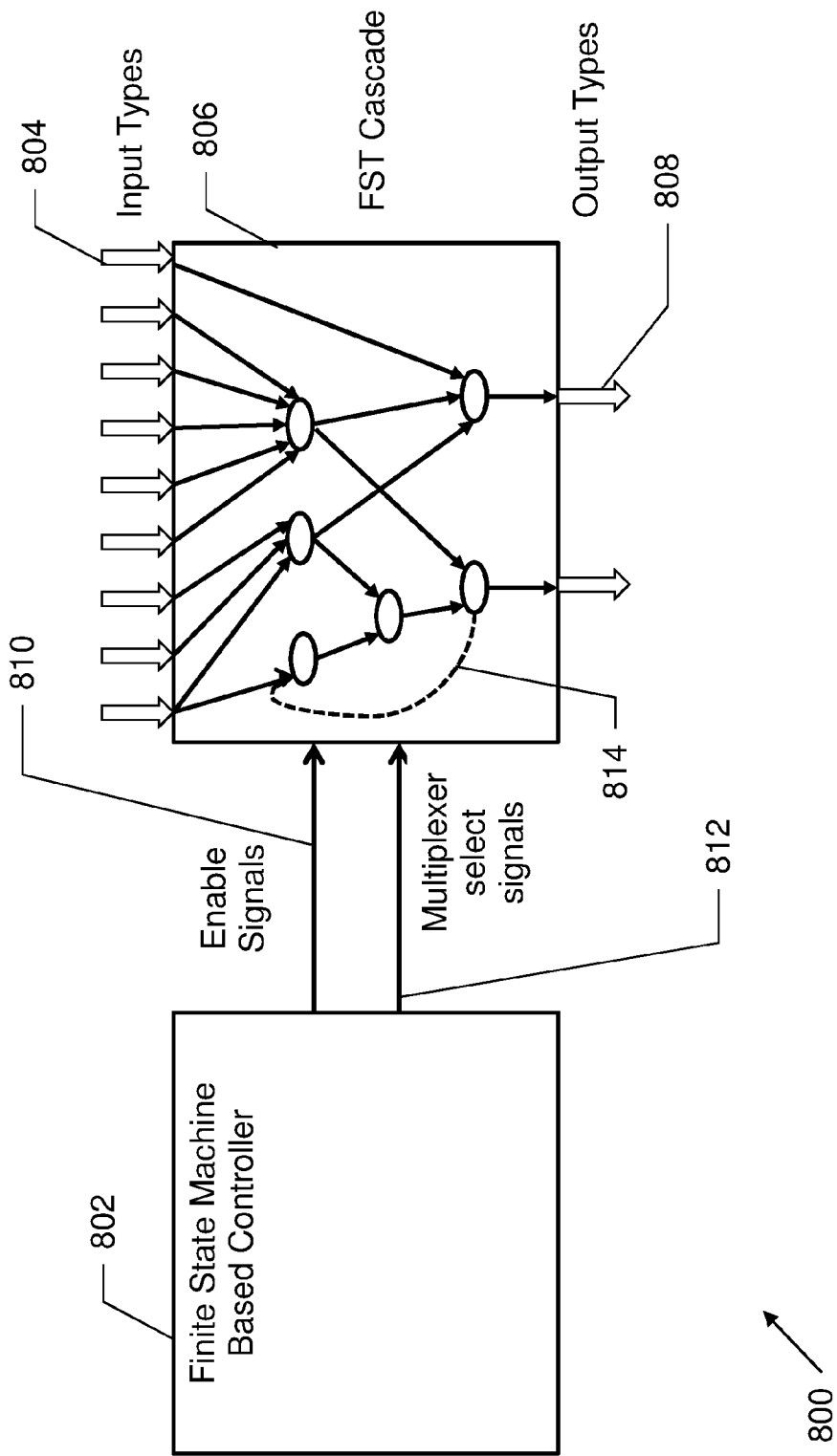
FIG. 8 is an exemplary block diagram of a scanner that may be composed of several interacting FSTs.

As shown in the example of FIG. 8, a scanner 800 may be composed of several interacting FSTs. For each scanner, an FST cascade 806 may be constructed by analyzing the data dependencies between the FSTs. Such an analysis may take into account the input data types 804 and the output data types 808 of the FSTs and the control flow information given in the scanner description. More formally, if an FST f1 produces a type that is consumed by the FST f2 and if f2 is executed after f1, a streaming interface may be created between f1 and f2 to transfer the respective data type from f1 to f2. FST cascade 806 may be controlled by a finite-state-machine-based controller 802, which may provide enable signals 810 and/or multiplexer select signals 812. Unlike scanner cascades, FST cascades may contain loops, such as loop 814. A streaming interface alone is not sufficient to handle such cases unless the loop is completely unrolled. To support loops, a finite-state-machine-based controller 802, shown in FIG. 8, may be added to the system. Once the loop iterations start, the finite-state-machine-based controller 802 may ensure that the FSTs that depend on the results computed by the loop are stalled until the termination of loop iterations. The loop iterations may update some of the input and output data types, if the same data type is both an input data type 804 and an output data type 808.

Figure 9:
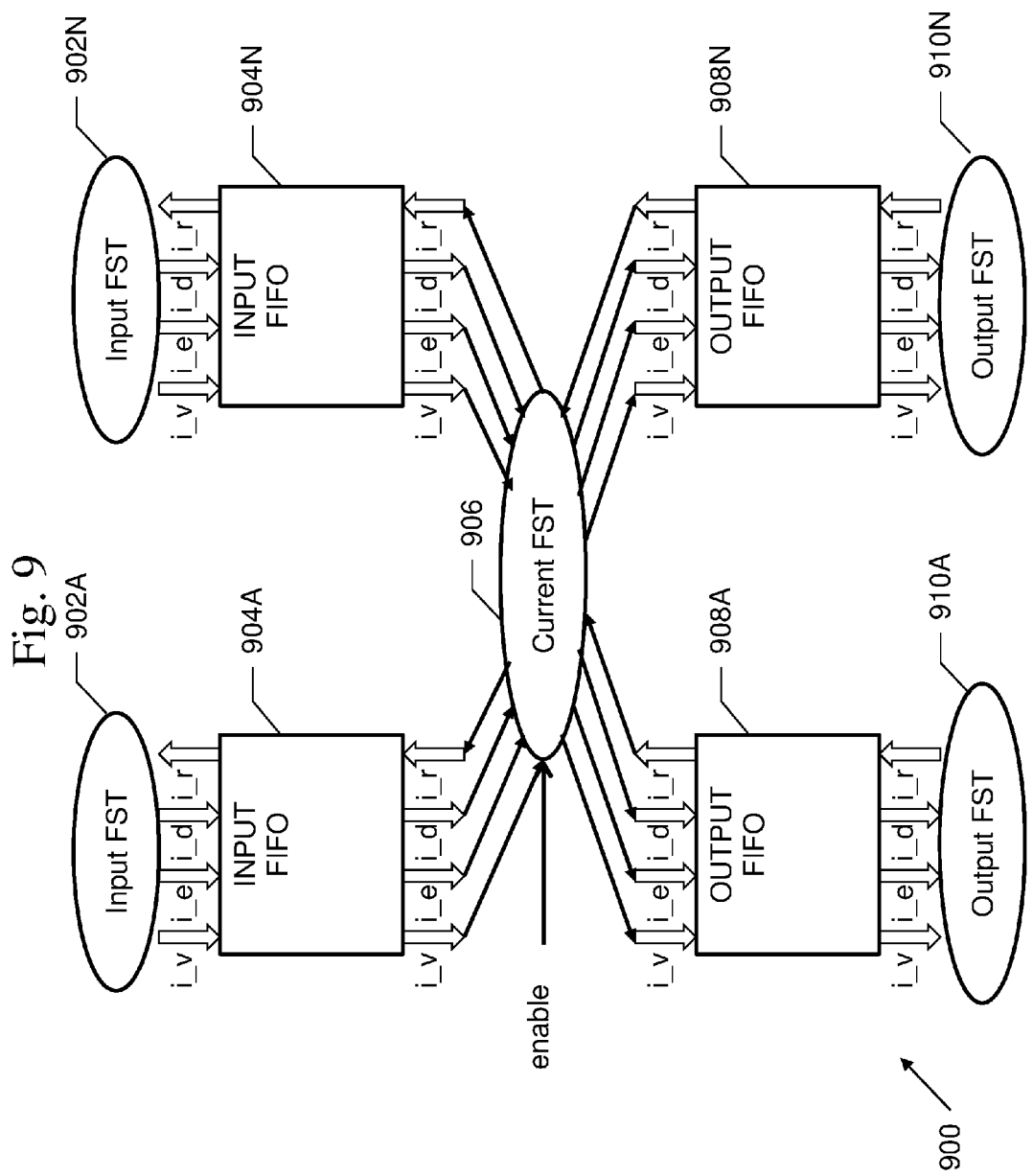
FIG. 9 is an exemplary block diagram of a streaming interface that may be created between FSTs.

An example of a streaming interface 900 that may be created between the FSTs is shown in FIG. 9. For example, an FST may be a network of nondeterministic finite state automaton (NFA) states that exchange types and features. The transitions between NFA states may test and set/post data types and features. In this example, there may be one or more input FSTs 902A-N, one or more input FIFOs 904A-N, a current FST 906, one or more output FIFOs 908A-N, and one or more output FSTs 908A-N. A handshake protocol may be used to transfer data between the FSTs. For example, an FST input may be consumed if 1) the FST is enabled, 2) all inputs of the FST contain valid data (for example i_v=true), and 3) the input has the smallest start offset. Input synchronization may require buffering. When processing the body of a loop, additional input multiplexers may be needed to select the more recent of the two as the input of the next iteration. The multiplexer select signals may be provided by the finite-state-machine-based controller 802, shown in FIG. 8, in such cases. Finally, an FST may require that all of its input data types to be ready to proceed with execution and may consume in parallel all the input data types having the smallest character start offset. This may require the FSTs to stall until all their input data types become available (such as assertion of an i_v signal). As a result, input buffering may be needed for all the input data types of an FST.

Figure 10:
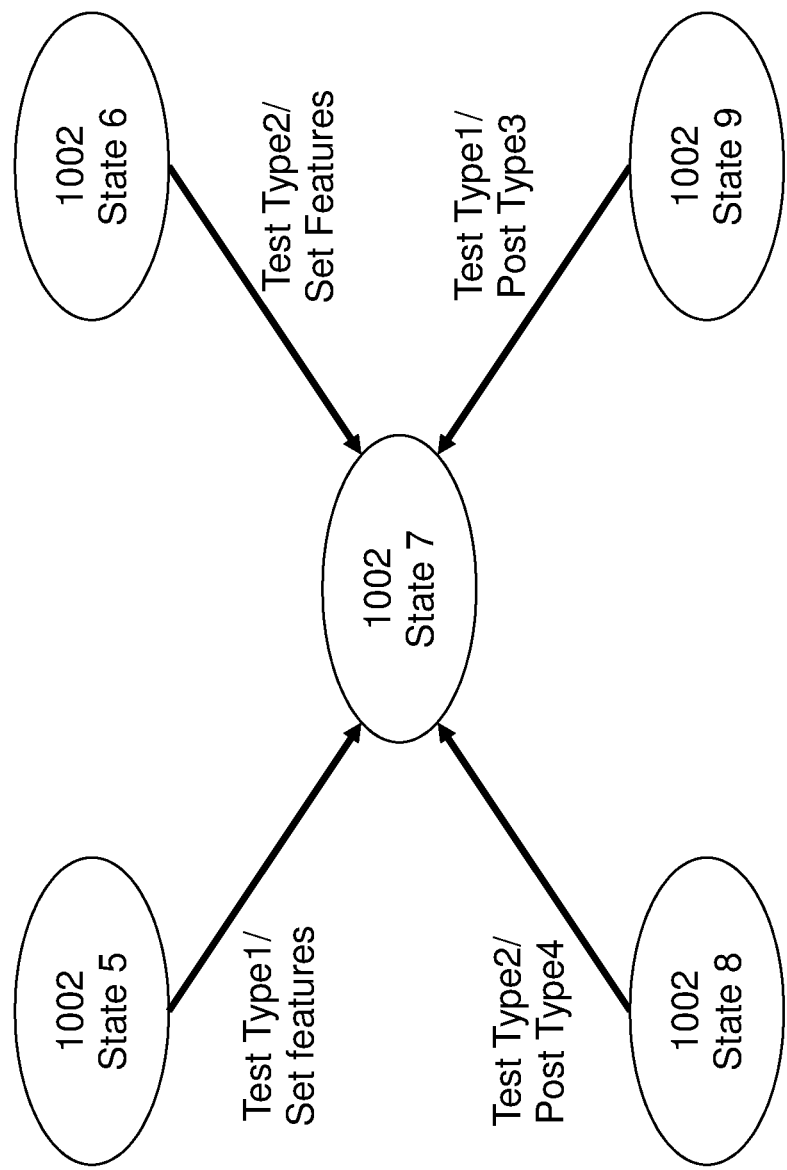
FIG. 10 is an exemplary block diagram of an FST that may be modeled as a nondeterministic finite state automaton (NFA).

An FST may require all of its input data types to be available to proceed with its computation. However, only the input data types having the smallest character start offset may be fetched and used by the FST. An FST may be modeled as a nondeterministic finite state automaton (NFA), for example, as shown in FIG. 10. In the example of FIG. 10, an FST may be implemented as a network of NFA states that exchange types and features, wherein multiple NFA states may be concurrently active, and multiple independent state transitions may be executed in parallel. For example, an NFA-based architecture for regular expression matching may be implemented. Unlike a regular expression matching architecture, an FST may receive input symbols that are complex data types. The FST may update these input symbols or may create new output symbols that are again complex data types. Supporting complex data types may require the FST to use additional registers to store temporary information about the updated or posted data types and all or part of the features associated with these types, for example, as shown in FIGS. 9 and 10.

Figure 11:
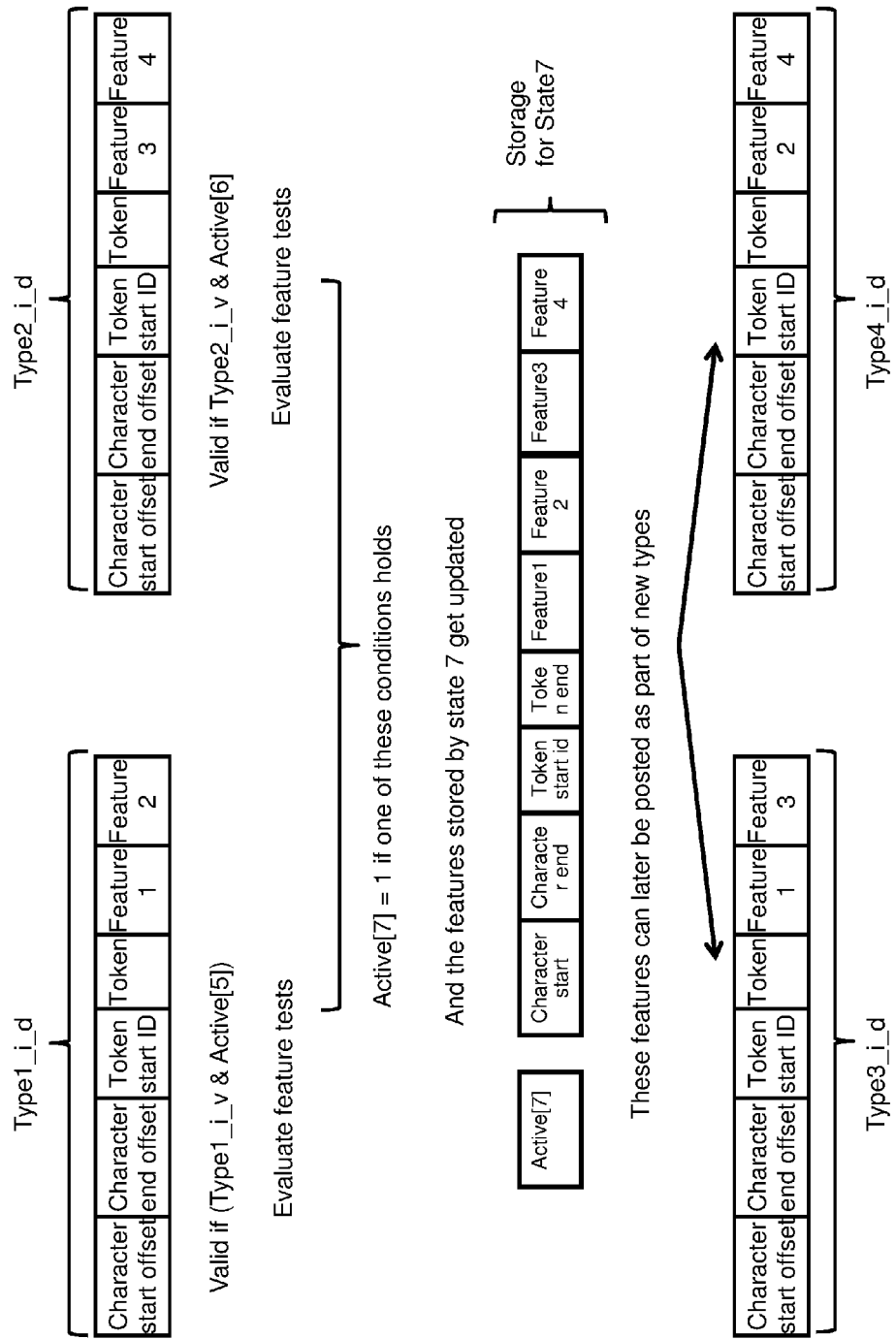
FIG. 11 is an exemplary block diagram of state transition logic in an NFA that may be implemented as a network of states.

For example, an NFA may be implemented as a network of states, where each state stores an active bit, and a transition from state i to state j occurs only if 1) state i is active, 2) there is an edge from state i to state j in the state transition graph of the NFA, and 3) the current input symbol satisfies the condition specified on the edge from state i to state j. An example of such state transition logic is shown in FIG. 11. Differences between the NFA of a regular expression and the NFA of an FST may include that several input symbols (for example, data types) may be provided to the FST concurrently, which may fire multiple different state transitions in parallel. Another difference may be that the conditions (for example, input tests) specified on the state transition graph are more complex. These may involve testing the character start and end offsets or the token start and end offsets to check if the current data type is adjacent to the previously consumed data type in the input text. The transitions between NFA states may test and set/post types and features. Input features may be compared against constant strings, numbers, dates, etc. Another difference may be that regular expression matching can be used to check if certain patterns exists in some of the selected features. Based on the result of the condition evaluation, a certain set of temporary variables and features may be updated in the local storage of the state. For example, some of the input features may be copied into some of the temporary features. These temporary features may also be posted as part of a new output data type.

Figure 12:
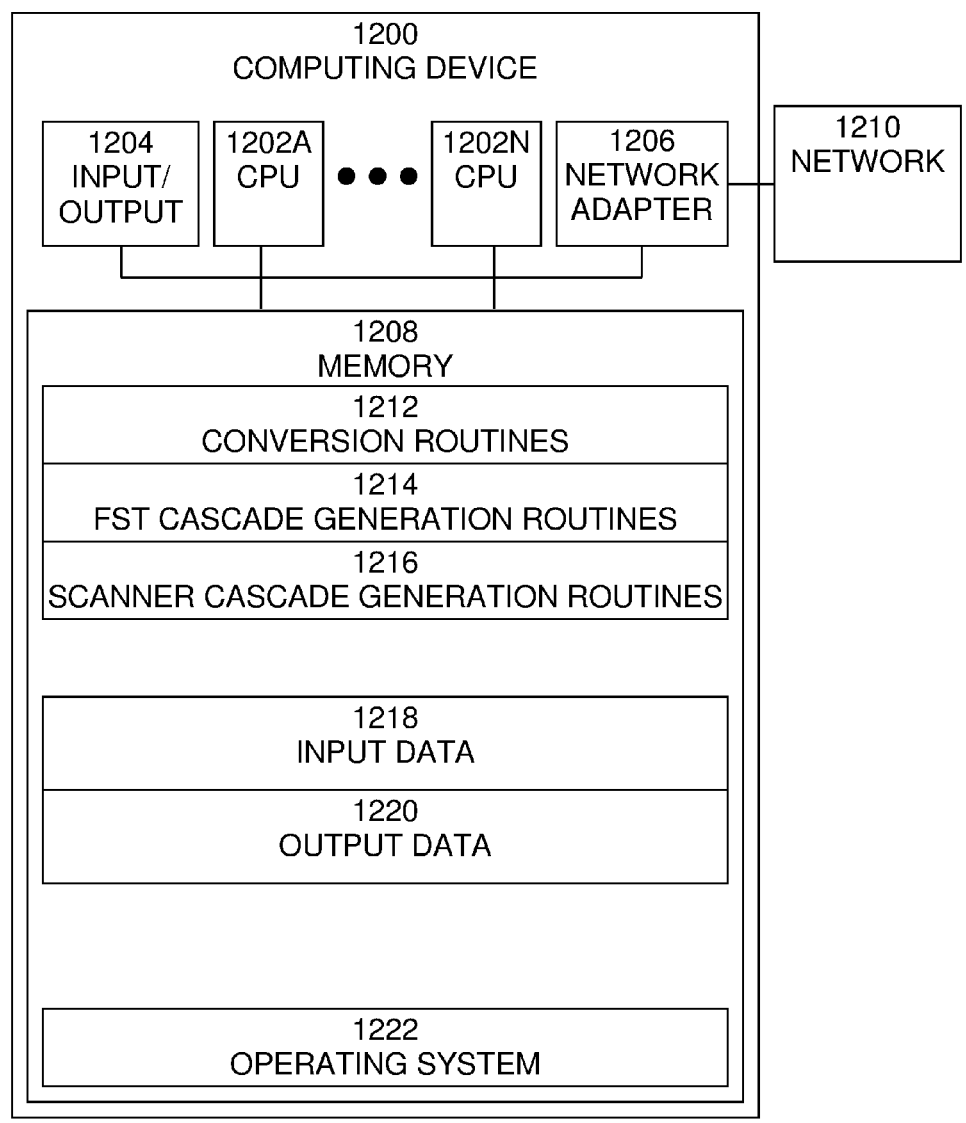
FIG. 12 is an exemplary block diagram of a computer system in which processes involved in the embodiments described herein may be implemented.

An exemplary block diagram of a computing device 1200, in which processes involved in the embodiments described herein may be implemented, is shown in FIG. 12. Computing device 1200 is typically a programmed general-purpose computer system, such as an embedded processor, system on a chip, personal computer, workstation, server system, and minicomputer or mainframe computer. Likewise, computing device 1200 may be implemented in a wrist-worn, or other personal or mobile device, and may include sensor circuitry as well as display circuitry to display object identification information. Computing device 1200 may include one or more processors (CPUs) 1202A-1202N, input/output circuitry 1204, network adapter 1206, and memory 1208. CPUs 1202A-1202N execute program instructions in order to carry out the functions of the present invention. Typically, CPUs 1202A-1202N are one or more microprocessors, such as an INTEL PENTIUM® processor. FIG. 12 illustrates an embodiment in which computing device 1200 is implemented as a single multi-processor computer system, in which multiple processors 1202A-1202N share system resources, such as memory 1208, input/output circuitry 1204, and network adapter 1206. However, the present invention also contemplates embodiments in which computing device 1200 is implemented as a plurality of networked computer systems, which may be single-processor computer systems, multi-processor computer systems, or a mix thereof.

Input/output circuitry 1204 provides the capability to input data to, or output data from, computing device 1200. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 1206 interfaces device 1200 with a network 1210. Network 1210 may be any public or proprietary LAN or WAN, including, but not limited to the Internet.

Memory 1208 stores program instructions that are executed by, and data that are used and processed by, CPU 1202 to perform the functions of computing device 1200. Memory 1208 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 1208 may vary depending upon the function that computing device 1200 is programmed to perform. In the example shown in FIG. 12, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present invention contemplates any and all such arrangements.

In the example shown in FIG. 12, memory 1208 may include conversion routines 1212, FST cascade generation routines 1214, scanner cascade generation routines 1216, input data 1218, output data 1220, and operating system 1222. For example, conversion routines 1212 may include routines that convert one or more grammar files in input data 1218 into hardware description files, such as Verilog files. FST cascade generation routines 1214 may include routines to generate FST cascade within FSTs, for example by analyzing data dependencies across the scanners contained in the PEAR file in input data 1218. Scanner cascade generation routines 1216 may include routines to generate scanner cascades for a complete analysis engine or for a selected set of scanners used in the PEAR file in input data 1218. The output of these routines may be stored as output data 1220. Operating system 1222 provides overall system functionality.

As shown in FIG. 12, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A cascaded finite-state-transducer array, comprising:
a plurality of finite-state-transducers, the finite-state-transducers being distributed in space, at least one finite-state-transducer including a loop; and
a finite-state-machine based controller adapted to control stalling of processing of the loop by the at least one finite-state-transducer;
wherein the array is configured with dedicated data transfer channels between the finite-state-transducers to transfer specific data types.

2. The cascaded finite-state-transducer array of claim 1, wherein:
each data stream on a dedicated data transfer channel transmits a particular data type, which is sorted in increasing order of start offsets or token IDs.

3. The cascaded finite-state-transducer array of claim 1, further comprising circuitry for each finite-state-transducer adapted to synchronize input streams of the respective finite-state-transducers by requiring either a valid-data or an input-end signal on each stream.

4. The cascaded finite-state-transducer array of claim 3, wherein the input-end signal comprises one of an end-of-stream, end-of-sentence, and an end-of-paragraph signal.

5. The cascaded finite-state-transducer array of claim 3, further comprising circuitry for each finite-state-transducer adapted to produce an input-end signal for the finite-state-transducer when all input data streams of the finite-state-transducer contain an input-end signal.

6. The cascaded finite-state-transducer array of claim 1, further comprising input buffering circuitry for each finite-state-transducer adapted to stall or pause processing of the finite-state-transducer until all input data streams of the finite-state-transducer contain data that can be consumed.

7. The cascaded finite-state-transducer array of claim 1, further comprising circuitry for each finite-state-transducer adapted to fetch data only from the input streams containing valid data and having a smallest start offset or start token ID.

8. A cascaded finite-state-transducer array, comprising:
a plurality of finite-state-transducers, the finite-state-transducers being distributed in space;
a top-level pipeline comprising a decoder adapted to decode data types of data input to the array; and
a multiplexer to multiplex data types of data output from the array;
wherein the array is configured with dedicated data transfer channels between the finite-state-transducers to transfer specific data types.

9. A cascaded finite-state-transducer array, comprising:
a plurality of finite-state-transducers, at least one finite-state-transducer including a loop, the finite-state-transducers comprising a network of nondeterministic finite state automatons, the nondeterministic finite state automatons being distributed in space; and
a finite-state-machine based controller adapted to control stalling of processing of the loop by the at least one finite-state-transducer;
wherein the array is configured with dedicated data transfer channels between the finite-state-transducers to transfer specific data types.

10. The cascaded finite-state-transducer array of claim 9, further comprising circuitry for each finite-state-transducer adapted to locally store, in each finite-state-transducer state, a number of features incrementally built from input data streams of the finite-state-transducer.

11. The cascaded finite-state-transducer array of claim 10, further comprising circuitry for each finite-state-transducer adapted to update the locally stored features on state transitions, or write the locally stored features to outputs of the finite-state-transducer on state transitions.

12. The cascaded finite-state-transducer array of claim 11, wherein each finite-state-transducer comprises circuitry adapted to determine when two independent state transitions lead to a same destination state and to update the locally stored features based on a state transition that is associated with a higher priority data type, a state transition originating from a source state that stores a smaller start-offset value, or a state transition that is associated with a data type that stores a larger end-offset or end-token-ID value.

13. A cascaded finite-state-transducer array, comprising:
a plurality of finite-state-transducers, the finite-state-transducers comprising a network of nondeterministic finite state automatons, the nondeterministic finite state automatons being distributed in space; and
a top-level pipeline comprising a decoder adapted to decode data types of data input to the array, and a multiplexer to multiplex data types of data output from the array;
wherein the array is configured with dedicated data transfer channels between the finite-state-transducers to transfer specific data types.

14. A computer-implemented method for generating a cascaded finite-state-transducer implementation, comprising:
compiling a grammar file containing specification of cascading grammar analytics to a hardware description file containing a hardware description of finite-state-transducer circuitry to implement a plurality of scanners using the cascading grammar analytics;
generating, for each finite-state-transducer, a hardware description of a cascade of finite-state-transducers based on data dependencies within each scanner; and
generating, for each finite-state-transducer, a hardware description of a cascade of scanners based on data dependencies across the plurality of scanners.

15. The method of claim 14, wherein the grammar file is compiled by:

intercepting intermediate data structures in the grammar file to determine nondeterministic finite state automaton representations of the plurality of finite-state-transducers;
reducing complexity of nondeterministic finite state automaton representations; and
generating a hardware description of finite-state-transducer circuitry based on the reduced nondeterministic finite state automaton representations.

16. The method of claim 15, wherein the hardware description of the cascade of finite-state-transducers based on data dependencies within each scanner is generated by:
constructing a data-flow-graph representation of each scanner, wherein nodes of the data-flow-graph representation represent finite-state-transducers of the scanner and the edges represent the data types transferred between the finite-state-transducers of the scanner; and
generating the hardware description based on the data-flow-graph representations.

17. The method of claim 15, wherein the hardware description of the cascade of finite-state-transducers across the plurality of scanners is generated by:
constructing a data-flow-graph representation of each scanner, wherein nodes of the data-flow-graph representation represent the scanners and the edges represent the data types transferred between the scanners; and
generating the hardware description based on the data-flow-graph representations.

* * * * *